Patented Feb. 9, 1926.

1,572,510

UNITED STATES PATENT OFFICE.

FREDERICK C. ATKINSON, OF INDIANAPOLIS, INDIANA, ASSIGNOR TO JOHN W. GARLAND, INC., OF PITTSBURGH, PENNSYLVANIA.

DESTRUCTIVE DISTILLATION.

No Drawing.    Application filed August 20, 1919.   Serial No. 318,750.

*To all whom it may concern:*

Be it known that I, FREDERICK C. ATKINSON, a citizen of the United States, residing at Indianapolis, in the county of Marion and State of Indiana, have invented certain new and useful Improvements in Destructive Distillation, of which the following is a specification.

This invention relates to the destructive distillation of various substances, such as those waste materials obtained in the production of corn, oats, rice, etc., and it is among the objects of this invention to obtain certain products from the dry distillation of vegetable matter such as corn cobs, oat hulls, rice hulls, and many other materials of a similar character, herein called waste vegetable matter.

In carrying the objects of my invention into effect, I provide a process of distillation of these waste matters whereby I am enabled to obtain a number of products of the distillation which have new and valuable uses in various industries.

I have found that upon the dry distillation of such cellular material as corn cobs, etc., there is produced a distillate containing an acid constituent which, on treatment with salt yields a further quantity of tar which rises to the surface of the liquid which is a valuable tanning material, as described and claimed in my co-pending application for process of tanning hides, Serial No. 306,780.

I have also found that there is simultaneously produced, an oily or tarry liquid which can be separated from the acid material by allowing the distillate to stand, when the oil sinks to the bottom of the container, and is removed. This constituent contains phenols, guiacols, and cresols, and containing a large proportion of the higher phenols and the cresols. On redistillation of the oily layer, a fraction is produced which appears to consist principally of the cresols and has properties very similar to those of the creosote obtained from the distillation of wood, especially beech-wood.

The following is a specific example of my process:

Waste vegetable matter as corn cobs are crushed to the proper size and then preferably subjected to an extraction process, such as is described and claimed in my co-pending application for leather dressing and tanning material, Serial No. 317,899, filed Aug. 16, 1919. Said extraction process consists in heating a mixture of water and corn cobs coarsely broken up in an autoclave by means of a jet of steam until the pressure within the autoclave reaches seventy-five pounds per square inch and holding the pressure at seventy-five to one hundred pounds per square inch for two to three hours by means of said jet of steam. The extracted cobs are dried and placed in a closed retort where the temperature is gradually raised to a maximum of 400 to 500 degrees C.; a temperature of 440 degrees C. having been found to give excellent results. The charcoal remaining in the retort is exceptionally free from mineral matter and is described and claimed in my co-pending application for charcoal and method of preparing the same, Serial No. 317,904, filed Aug. 16, 1919. The vapors given off are condensed as well-known, and the condensate allowed to stand until it has separated into two layers.

The oily layer is removed and subjected to distillation which yields several fractions, that boiling between 150 and 250 degrees C. containing the cresols and bearing a strong resemblance to the creosote obtained from beechwood. This fraction is agitated with caustic soda of about 4-10% strength to saponify the phenolic bodies. The oil separates into two layers, one of which contains the saponified constituents, and the other unsaponifiable matter which is being further studied. Better results are obtained by treating the fraction with a 15-25% solution of caustic soda, and then diluting down to 4-10% with water after the saponification is complete. The two layers then separate more readily and more completely.

A résumé of the process may be made as follows:

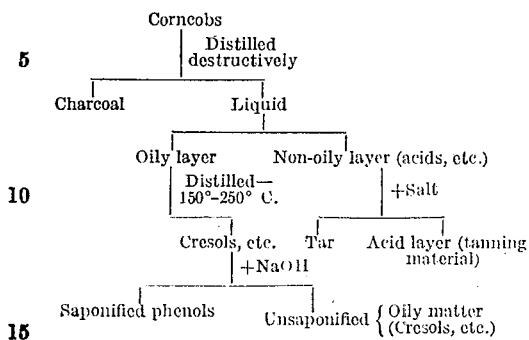

Having thus fully described my said invention, what I claim as new and desire to secure by Letters Patent, is:

1. A process of producing a creosote which includes crushing corn cobs, extracting and then drying the same, destructively distilling said corn cobs in a closed retort at a high temperature, collecting the distillate, separating the oily constituent, from the balance of the distillate and redistilling the said oily constituent.

2. A process of purifying corn cob creosote which consists in agitating the creosote fraction with strong caustic alkali solution, diluting with water, and separating the saponified from the unsaponified material.

3. A process of purifying corn cob creosote which consists in agitating the creosote fraction with 15–25% caustic alkali solution, diluting with water to 4–10% caustic alkali solution, and separating the saponified from the unsaponified material.

4. A process of treatment of waste vegetable matter for producing a creosote comprising extracting and drying said matter, destructively distilling it in a closed retort at a high temperature, collecting the distillate, separating the oily constituent from the balance of the distillate, and redistilling said constituent, substantially as set forth.

5. A process of producing a creosote which consists in crushing corn cobs, extracting and then drying the same, destructively distilling said corn cobs in a closed retort at a high temperature, collecting the distillate, separating the oily constituent, redistilling the same, and purifying the creosote fraction.

6. A process of producing a creosote which consists in destructively distilling corn-cobs to produce an oily liquid and an acid liquid, separating the oily liquid, redistilling the same, isolating the creosote fraction boiling between approximately 150° and 200° C., agitating the creosote fraction with strong alkali solution, diluting with water, and separating the saponified from the unsaponified material, substantially as set forth.

In witness whereof, I have hereunto set my hand and seal at Indianapolis, Indiana, this 16th day of August, A. D. nineteen hundred and nineteen.

FREDERICK C. ATKINSON. [L. S.]